United States Patent [19]

Schulz

[11] Patent Number: 5,233,531
[45] Date of Patent: Aug. 3, 1993

[54] REMOTE POSTAGE METER RESETTING BY FACSIMILE COMMUNICATION

[75] Inventor: Kenneth A. Schulz, Bethel, Conn.
[73] Assignee: Pitney Bowes Inc., Stamford, Conn.
[21] Appl. No.: 632,866
[22] Filed: Dec. 24, 1990
[51] Int. Cl.⁵ .............................................. G07B 17/00
[52] U.S. Cl. ................... 364/464.02; 235/381
[58] Field of Search ............... 364/464.02, 464.03; 235/380, 381, 382, 382.5

[56] References Cited

U.S. PATENT DOCUMENTS

| | | | |
|---|---|---|---|
| 4,097,923 | 6/1978 | Eckert, Jr. et al. | 364/900 |
| 4,422,148 | 12/1983 | Soderberg et al. | 364/409 X |
| 4,629,871 | 12/1986 | Scribner et al. | 235/382.5 X |
| 4,807,139 | 2/1989 | Liechti | 364/464.02 |
| 4,853,869 | 8/1989 | Durst, Jr. et al. | 364/464.02 X |
| 4,862,386 | 8/1989 | Axelrod et al. | 364/464.02 X |
| 4,949,272 | 8/1990 | Vanourek et al. | 364/464.02 |
| 5,077,694 | 12/1991 | Sansone et al. | 364/464.03 X |
| 5,079,714 | 1/1992 | Manduley et al. | 364/464.02 X |

Primary Examiner—Edward R. Cosimano
Attorney, Agent, or Firm—Robert H. Whisker; Melvin J. Scolnick

[57] ABSTRACT

A system and method for the recharge of postage meters. A request for recharge of a postage meter is transmitted to a remote location as a facsimile image. The information in the request is extracted using OCR or similar techneques and transmitted to a data processing center which verifies the request and, if verified, returns a unique code which will recharge the requesting meter. The code is transmitted to the requesting meter as a second facsimile image.

18 Claims, 4 Drawing Sheets

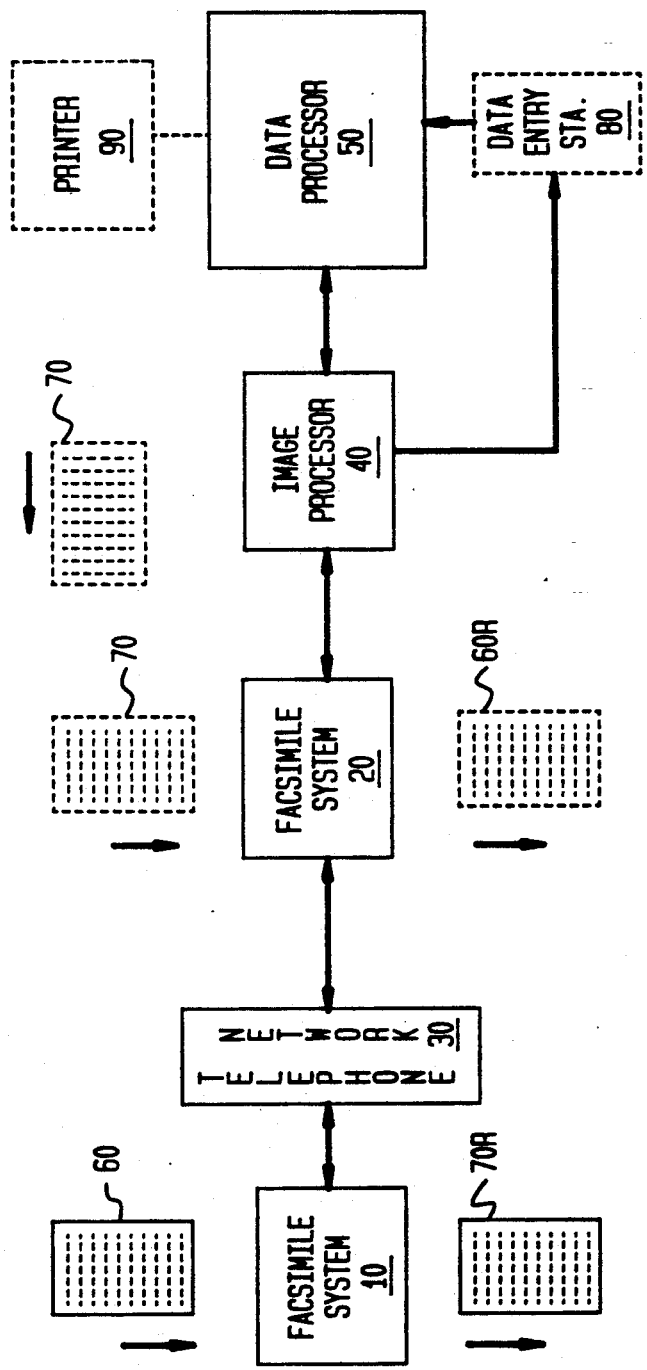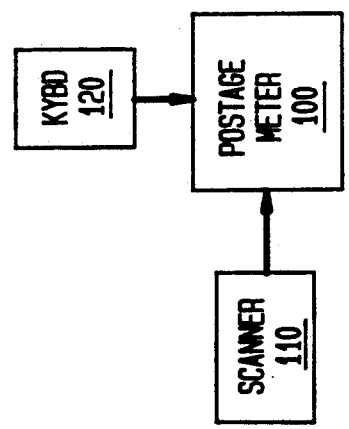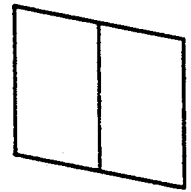

FIG. 3

200
PITNEY BOWES
POSTAGE BY FACSIMILE
TRENDY MARKETING CORP.
TRANQUIL SWAMP, CT 062022

TRANSFER AUTHORIZATION NO. 0100
210
DATE _____

TRANSFER FUNDS IN THE AMOUNT OF.................... $____.00

230
_____ DOLLARS

```
0 0 0 0
1 1 1 1    ~240
2 2 2 2
3 3 3 3
4 4 4 4 ←—242
5 5 5 5
6 6 6 6
7 7 7 7
8 8 8 8
9 9 9 9
```

FROM RMRS ACCOUNT NO. 022556
250
TO PITNEY BOWES METER NO. 5086704

260
ACCESS CODE**DISPLAYED BY METER IS: _____

252 (barcode)

```
0 0 0 0 0 0 0 0
270—1 1 1 1 1 1 1 1
     2 2 2 2 2 2 2 2
272→3 3 3 3 3 3 3 3
     4 4 4 4 4 4 4 4
     5 5 5 5 5 5 5 5
     6 6 6 6 6 6 6 6
     7 7 7 7 7 7 7 7
     8 8 8 8 8 8 8 8
     9 9 9 9 9 9 9 9
```

SIGNATURE _____ 290

INSTRUCTIONS 280

* COPY AMOUNT TO BE TRANSFER INTO SPACES. DARKEN THE CORRESPONDING BOX BELOW EACH DIGIT.
** OBTAIN ACCESS CODE FROM YOUR MODEL 6900 POSTAGE METER. LIFT THE DATER COVER. PRESS THE ACCESS CODE BUTTON. A 4 TO 8 DIGIT ACCESS NUMBER WILL APPEAR IN THE DISPLAY WINDOW. COPY THIS CODE INTO THE SPACES ABOVE. IN EACH COLUMN, CIRCLE OR MARK THROUGH THE APPROPRIATE DIGIT.

FIG. 5

PITNEY BOWES
POSTAGE ~~BY~~ FACSIMILE 300
TRENDY MARKETING CORP.
TRANQUIL SWAMP, CT 062022

RELEASE OF FUNDS        340
FROM RMRS ACCOUNT NO. 022556
TO PITNEY BOWES METER NO. 5086704

DATE: JANUARY 1, 1991
TIME: 10:45 AM      320

IN THE AMOUNT OF    ONE THOUSAND DOLLARS    $ 1000.00   330

TO COMPLETE THIS TRANSACTION AND MAKE THE TRANSFERRED FUNDS AVAILABLE FOR USE IN YOUR POSTAGE METER, FOLLOW THESE STEPS:

370

1) TAKE THIS SHEET TO YOUR MODEL 6900 POSTAGE METER
   WIPE THE BARCODE WAND OVER THIS CODE:  350

2) NOW WIPE THE WAND OVER THIS CODE: 360

3) YOU CAN CHECK YOUR NEW METER BALANCE BY PRESSING THE
   [ POSTAGE UNUSED ] KEY.

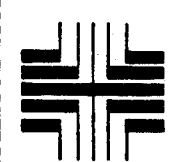

PITNEY BOWES
POSTAGE BY FACSIMILE  300-1
TRENDY MARKETING CORP.
TRANQUIL SWAMP, CT 062022

RELEASE OF FUNDS  340-1
FROM RMRS ACCOUNT NO. 022556
TO PITNEY BOWES METER NO. 5086704

DATE: JANUARY 1, 1991
TIME: 10:45 AM  320-1

IN THE AMOUNT OF  ONE THOUSAND DOLLARS   $ 1000.00   330-1

TO COMPLETE THIS TRANSACTION AND MAKE THE TRANSFERRED FUNDS AVAILABLE FOR USE IN YOUR POSTAGE METER, FOLLOW THESE STEPS:

1) TAKE THIS SHEET TO YOUR MODEL 6900 POSTAGE METER. PRESS NUMBER KEYS

[1][0][0][0]  390

410

IF YOU MAKE AN ERROR, PRESS [C] TO CLEAR THE DISPLAY,
   THEN ENTER THE CORRECT DIGITS.

2) LIFT THE DATER COVER AND PRESS THE [ENTER AMOUNT] KEY.

THE DISPLAY WILL SHOW -0.00- (FLASHING).

3) PRESS NUMBER KEYS

[5][0][5][4][8]  400

IF YOU MAKE AN ERROR, PRESS [C] TO CLEAR THE DISPLAY,
   THEN ENTER THE CORRECT DIGITS.

4) LIFT THE DATER COVER AND PRESS THE [ENTER COMBINATION] KEY.

THE DISPLAY WILL SHOW -0.00- (STEADY NOT FLASHING).

5) YOU CAN CHECK YOUR NEW METER BALANCE BY PRESSING THE
   [POSTAGE UNUSED] KEY.  380-1

REMOTE POSTAGE METER RESETTING BY FACSIMILE COMMUNICATION

BACKGROUND OF THE INVENTION

The subject invention relates to a method an apparatus for remote resetting of postage meters and similar systems. More particularly it relates to the use of facsimile communications in postage meter resetting.

A system for the remote resetting (or recharging) of postage meters is marketed by the assignee of the present application under the trademark "Postage-By-Phone" and is described in U.S. Pat. No. 4,097,923; to: Eckert et al. Briefly stated to recharge a meter an operator obtains an "access code" from the meter. This code represents an encryption of at least a "control sum" and the meter serial number, where the control sum corresponds to the total amount of funds with which the meter has been charged to date. This access code is generated by the meter and may be read from the meter display upon operator request. The operator then communicates the access code, the amount by which the meter is to be recharged, an account number against which the recharge amount is to be debited, and the meter identification number to a remote data processing center. At the data processing center the access code is validated and a "combination code" (sometimes hereinafter "recharge code") is generated as a function of at least the amount by which the meter is to be recharged and the meter identification number. This recharge code is communicated to the operator who enters the amount together with the recharge code into the postage meter through its keyboard. The postage meter then validates the recharge code and increments the descending register of the meter by the amount requested. (As is well known in the postage meter art the descending register of a postage meter is decremented by the amount of postage, and the ascending register is incremented by that amount, each time the meter prints an indicia. The control sum is thus the sum of the contents of the descending and ascending registers. The meter is of course designed so that it will not print postage if sufficient funds are not available in the descending register.)

Generally, the operator communicates with the remote data processing center through a "touch-tone" phone to enter information directly into a data processing system at the remote center using well known "Touch-Tone" techniques for data communication. ("Touch-Tone" is a trademark of AT&T Corporation for transmission of data over the telephone lines using unique tones generated by the keypad of a telephone.) A voice synthesis system at the remote center then communicates the combination code to the user over the telephone, who then manually enters it into the postage meter. In the event a "Touch-Tone" telephone is not available the user may communicate with the remote data processing center through an operator.

While "Postage-by-Phone" has been highly successful and is widely accepted for the recharging of postage meters a transaction as described above requires the operator to enter approximately 60 key strokes. This large amount of data entry required of the operator increases the possibility of mistakes.

BRIEF SUMMARY OF THE INVENTION

Thus it is an object of the subject invention to provide a system for the remote recharging of postage meters which decreases the amount of operator intervention required and reduces the opportunities for error.

It is another object of the subject invention to provide such a system with minimal changes to existing remote postage meter recharging systems.

The above objects are achieved and the disadvantages of the prior art are overcome in accordance with the subject invention by means of a method and system for remote recharging of postage meters where information needed to recharge a postage meter is entered onto a form, the recharge information identifying at least the amount by which the meter is to be recharged, and then transmitting an image of that form to a remote data processing center. When the image is received the information is extracted from the image and entered into a data processor, which responds to output a second image the second image including a representation of a recharge code for recharging the meter. The second image is then transmitted to the location of the postage meter, and when the second image is received the recharge code is extracted and entered into the postage meter to recharge the meter.

In accordance with one aspect of the subject invention the form includes additional information, including the meter identification number and the account to be charged, preprinted in machine readable form.

In accordance with another aspect of the subject invention, the recharge information is entered into predetermined fields in machine readable form by the operator, and the fields include guides for facilitating entry of the information in machine readable form.

In accordance with another aspect of the subject invention, the second image includes a first field for a representation of the amount of recharge and a second field which includes a representation of the recharge code and the form includes instructions for entering the amount and recharge code in a sequence consistent with the operation of the postage meter.

In accordance with another aspect of the subject invention, the image of the form is processed electronically when received to recognize the amount requested, the access code, and the account to be charged.

Thus it can be seen that the method and system of the subject invention advantageously achieve the above objects.

It is another advantage of the subject invention that the forms provide the user with a permanent, printed record of each transaction.

It is still another advantage of the subject invention that the forms may include preprinted instructions for conducting a transaction, thus eliminating the problem of misplaced or forgotten instructions and the resulting error and delays.

It is still another advantage that, using currently available high speed facsimile transmission it is expected that the total transmission time will be less than is currently achieved.

It is still another advantage of the subject invention that preprinted, serialized request forms provide an additional level of security in that such forms may be placed under lock and key.

It is still a further advantage of the subject invention that the request forms may include reminders and check offs for ordering meter supplies such as tapes and inks.

Other objects and advantages of the subject invention will be readily apparent to those skilled in art from consideration of the detailed description set forth below and of the attached drawings.

BRIEF DESCRIPTION OF THE DRAWINGS

FIG. 1 shows a system for facsimile communications of postage meter recharging information in accordance with the subject invention.

FIG. 2 shows a postage meter which may be recharged in accordance with the subject invention.

FIG. 3 shows a form for requesting recharge of a postage meter in accordance with the subject invention.

FIG. 4 shows a rectangular pattern of seven line segments in the form of the well known seven segment display for the display of numeric characters which is printed on a form as an indicia which provides a guide for entry of data into the form in machine readable form.

FIG. 5 shows a form bearing an image which includes a representation of an amount by which a postage meter is to be recharged and a corresponding recharge code.

FIG. 6 shows an alternative version of the form of FIG. 5.

BRIEF DESCRIPTION OF PREFERRED EMBODIMENTS OF THE INVENTION

In the system of FIG. 1, a conventional facsimile system 10 is provided at the location of a postage meter user. Facsimile system 10 need not be a dedicated system but may be any conventional, conveniently located facsimile system available to the user. At a remote data processing center, which is preferably a "Postage-by-Phone" data processing center such as is operated by the assignee of the present application, a second facsimile system 20 is provided. Preferably system 20 will be a dedicated system. Facsimile systems 10 and 20 communicate over the public switched telephone network, or in any other convenient manner.

Facsimile system 20 is connected to image processor 40 and transmits received images electronically to processor 40 without printing of a tangible copy. Systems for directly connecting facsimile systems to data processing systems such as image processor 40 are commercially available and include systems such as that marketed under the trademark PATH by the assignee of the present application, and need not be discussed further for an understanding of the subject invention.

In another embodiment image processor 40 transmits images for display to an operator at station 80 when processor 40 is unable to extract necessary information from such images so that the operator may intervene to interpret the image.

As will be seen from the discussion below, image processor 40 extracts data from images transmitted by system 10 and received by system 20 in a conventional manner. Typically, extraction of such information will involve reading bar code, simple character recognition of numerals, or simple mark sensing. All of these techniques are conventional, and well known in the art, and may be performed by any commercially available microprocessor based computer, and need not be discussed further here for an understanding of the subject invention.

Image processor 40 then converts this information into digital information in a format compatible with data processor 50 and transmits the information to data processor 50. Note that this information appears to data processor 50 to be identical to information received as "Touch-Tone" signals in existing remote meter recharging data processing centers. Accordingly, no changes need be made in the operation of data processing center 50.

Data processor 50 then returns the recharge code and other information to image processor 40 which converts the information into an image of a standard form and transmits the image to facsimile system 20, again in a conventional, known manner, for transmission over network 30 to facsimile system 10.

Facsimile system 10 then prints the received image for use by an operator in recharging a postage meter.

In using the system of FIG. 1 an operator first obtains an access code from a postage meter to be recharged, as shown in FIG. 2. As is conventional in the postage meter art the access code is an encryption of at least the control sum of the meter and the meter identification number, and so is a unique, unpredictable number for each transaction. The operator then enters the access code and the amount by which the meter is to be recharged onto form 60, which will be described in more detail below. Form 60 also includes additional information, in machine readable form, representing the meter identification number and account against which the recharge amount is to be charged.

The operator then controls facsimile system 10 to dial-up facsimile system 20 and transmits form 60. As described above the image of form 60 is received by system 20 the information for the recharge request is extracted by image processor 40, and transmitted to data processor 50. Assuming that there are sufficient funds in the account and the request is otherwise in order, data processor 50 generates a unique, unpredictable recharge code as an encryption of at least the amount requested and the access code and transmits this information to image processor 40, which converts the information into an image of a predetermined form. Image processor 40 then transmits the image to facsimile system 20 which, in turn, transmits the image to facsimile 10 over telephone network 30. Facsimile system 10 then prints a copy of the image as form 70R, for use by the operator in recharging the postage meter.

In another embodiment station 80 includes a display such as a CRT or a graphic printer to display images which cannot be recognized by processor 40. An operator can then attempt to recognize the image and input the correct data. If the image is unrecognizable the operator can control the system of FIG. 1 to send a request for retransmission form to facsimile system 10.

In another embodiment of the subject invention facsimile system may print a copy 60R of form 60 which may then be entered by an operator through data entry station 80 in a conventional manner. Station 80 may be either a keyboard for manual entry or may be a scanner and image processing system to automatically extract the information from copy 60R.

In another embodiment of the subject invention data processor 50 may control printer 90 to print a copy 70 of the second, reply image containing the recharge code. Copy 70 may then be transmitted by facsimile system 20 in a conventional manner.

When the operator receives copy 70R the operator may enter the information into a postage meter, such as postage meter 100 in FIG. 2, either by reading human readable information from copy 70R and entering it through meter keyboard 120, or the information in copy 70R may be in machine readable form and may be entered through scanner 110. Postage meter 100 is provided with a port for digital communication in parallel with the keyboard. Thus any data which may be entered through the keyboard may be entered through the port, and meter 100 may be operated from a remote station. Thus data from copy 70R may be entered through scanner 110, which is preferably a conventional, commercially available bar code scanner, and converted to digital information for transmission to meter 100. Details of the protocol for communication with postage meter 100 are provided in U.S. Pat. No. 4,422,148; to: Soderberg et al., and need not be discussed further here for an understanding of the subject invention.

FIG. 3 shows form 60 for use in requesting recharge of a postage meter in accordance with the subject invention. Field 200 in form 60 contains indicia which identify the operator of the postage meter recharging system and the user of the particular meter to be recharged. Field 210 contains indicia representing a transfer authorization number and a blank for entry of the date. This information is useful in providing an audit trail of meter recharges. Field 230 provides a blank for entry of the amount of recharge in both numeric and written form for record keeping purposes. Field 240 provides a field for entry of the amount in machine readable form, and includes indicia 242 which serve as guides for such entry. In the embodiment shown the machine readable form is simple mark sensing where a digit is represented by circling or crossing out the indicia representing that digit and the value is sense by detecting the position of the mark so made. Suh a system for entering data into a form in a machine readable form is well known, and will be familiar to anyone who has taken a national multiple choice test which is machine graded. Field 250 contains indicia representing the account number to be charged and the meter identification number in human readable form in order to assure that the proper form is used when a particular meter is recharged. Corresponding field 252 contains the same information in machine readable form, preferable conventional bar code. Field 260 contains blanks for the entry of the access code in human readable form for record keeping purposes. Field 270 is provided for entry of the access code in machine readable form and, again, includes indicia 272 to guide entry of such information. Field 280 includes instructions for use of the form and field 290 provides a signature block to provide a further control for an audit trail.

In another embodiment of the subject invention information may be entered simultaneously in human and machine readable form by providing for character recognition in place of mark sensing as shown. This may be enhanced by providing indicia as shown in FIG. 4 which represent guides for entry of numerals in the well known seven segment form which will be familiar to anyone who has used a self service gas pump. Generally such a guide would be printed in a conventional manner in a pale blue ink or in some other manner which would not be detected when scanning form 60. By so limiting the character set to numerals in seven segment form the character recognition task is highly simplified and is easily within the ability of a person of ordinary skill in the art.

In another embodiment of the subject invention form 60 may be used more generally by providing for entry of the meter identification number and/or account number in machine readable form by the operator in a manner as described above.

FIG. 5 shows second image 70 in accordance with one embodiment of the subject invention. Image 70 includes field 300 which contains indicia representing the operator of the remote postage meter recharging system and the user of the particular postage meter. Field 320 contains the date and time of the transaction, field 330 contains the amount of the recharge in written and numeric form and field 340 contains indicia representing the meter identification number and the account number in human readable form. Information in these fields is useful for record keeping purposes.

Field 350 contains machine readable indicia, preferably conventional bar code, which represents the amount by which the meter is to be recharged, as well as additional information representing any additional command signals necessary to enter the amount in accordance with the operation of postage meter 100. Field 360 contains indicia representing the recharge code and necessary command signals in the same manner. Field 370 contains instructions for assuring that fields 350 and 360 are entered in the proper sequence. When fields 350 and 360 are scanned by scanner 110, scanner 110 converts the information represented by the bar code into digital signals corresponding to key strokes of keyboard 120 and transmits this information to postage meter 100 which is then recharged in a known, conventional manner.

Field 380 contains additional instructions allowing the user to check that the transaction has been successfully completed.

FIG. 6 shows a second version of form 70 in accordance with another embodiment of the subject invention. In this embodiment the operator enters the amount and recharge code into postage meter 100 through keyboard 120 in a conventional manner. In FIG. 6 form 70 includes fields 300-1, 320-1, 330-1, 340-1 and 380-1 which are substantially identical to the corresponding fields in FIG. 5.

Field 390 contains indicia representing the amount by which postage meter 100 is to be recharged in human readable form, and field 400 contains indicia representing the recharge code. Field 410 contains instructions for assuring that the user enters this information in accordance with the conventional operation of meter 100 through keyboard 120.

The above embodiments of the subject invention have been provided by way of illustration only and other embodiments will be apparent to those skilled in the art from consideration of the above description and the attached drawings. Particularly systems other than simple stand alone postage meters are known, including manifest based systems where postage is dispensed for an entire batch of mail at one time, and the use of the subject invention with such systems is within the contemplation of the subject invention. Accordingly, limitations on the subject invention are to found only in the claims set forth below.

What is claimed is:

1. A method for recharging a postage metering system comprising the steps of:
    a) entering recharge information on a form, said recharge information identifying the amount by which said postage metering system is to be recharged;
    b) transmitting an image of said form to a remote data processing center;
    c) receiving said image at said center, extracting said recharge information identifying the amount by which said postage metering system is to be recharged;

d) said data processor responding to said recharge information to control output means to output a second image, said second image including a representation of a recharge code for recharging said postage metering system;

e) transmitting said second image to the location of said postage metering system;

f) receiving said second image at said location, extracting said recharge code from said second image, and entering said recharge code into said postage metering system; whereby said postage metering system is recharged by said amount;

g) wherein said recharge information is entered on said form as machine readable indicia; and, h) wherein data signals representing said received image are transmitted to an image processor, said image processor operating on said data signals to recognize said machine readable indicia and extract said recharge information, and said extracted recharge information is translated into second data signals in accordance with a predetermined format for entry into said data processor.

2. A method as described in claim 1 wherein said representation of said recharge code in said second image is in the form of second machine readable indicia.

3. A method as described in claim 2, wherein said second image is printed at said location to generate a recharge form and said form is scanned to enter said recharge information into said postage metering system.

4. A method as described in claim 3 wherein said second image is printed at said location to generate a recharge form and said form is scanned to enter said recharge information into said postage metering system.

5. A method for recharging a postage metering system comprising the steps of:

a) entering recharge information on a form, said recharge information identifying the amount by which said postage metering system is to be recharged;

b) transmitting an image of said form to a remote data processing center;

c) receiving said image at said center, extracting said recharge information form said image, and entering said recharge information into a data processor;

d) said data processor responding to said recharge information to control output means to output a second image, said second image including a representation of a recharge code for recharging said postage metering system;

e) transmitting said second image to the location of said postage metering system;

f) receiving said second image at said location, extracting said recharge code from said second image, and entering said recharge code into said postage metering system; whereby said postage metering system is recharged by said amount;

g) wherein said recharge information is entered on said form as machine readable indicia;

h) wherein said representation of said recharge code in said second image is in the form of second machine readable indicia; and i) wherein said second image is printed at said location to generate a recharge form and said form is scanned to enter said recharge information into said postage metering system.

6. A method for providing a recharge code for recharging a postage metering system, comprising the steps of:

a) receiving recharge information, said recharge information identifying the amount by which said postage metering is to be recharged;

b) generating said recharge code as a function of said amount;

c) generating an image, said image including a representation of said recharge code; and, d) transmitting said image to the location of said postage metering system;

e) wherein said recharge information is received as an image including a representation of machine readable indicia corresponding to said recharge information;

f) wherein data signals representing said received image are transmitted to an image processor, said image processor operating on said data signals to recognize said machine readable indicia and extract said recharge information, and said extracted recharge information is translated into second data signals in accordance with a predetermined format for entry into a data processor said data processor generating said recharge code.

7. A method as described in claim 6 wherein said representation of said recharge code in said second image is in the form of second machine readable indicia.

8. A method as described in claim 7 wherein said second image is printed at said location to generate a recharge form and said form is scanned to enter said recharge information into said postage metering system.

9. A method as described in claim 8 wherein said second machine readable indicia further represent digital information for entry of said recharge code in accordance with the operation of said postage metering system.

10. A method for providing a recharge code for recharging a postage metering system, comprising the steps of:

a) receiving recharge information, said recharge information identifying the amount by which said postage metering is to be recharged;

b) generating said recharge code as a function of said amount;

c) generating an image, said image including a representation of said recharge code; and, d) transmitting said image to the location of said postage metering system;

e) wherein said recharge information is received as an image including a representation of machine readable indicia corresponding to said recharge information;

f) wherein said representation of said recharge code in said second image is in the form of second machine readable indicia; and, g) wherein said second image is printed at said location to generate a recharge form and said form is scanned to enter said recharge information into said postage metering system.

11. A method as described in claim 10 wherein said second machine readable indicia further represent digital information for entry of said recharge code in accordance with the operation of said postage metering system.

12. A system for providing a recharge code for recharging a postage metering system; comprising:

a) data processing means for generating a recharge code for a postage metering system as a function of a specified amount;
b) input means for input of said specified amount to said data processing means;
c) output means responsive to said data processing means for output of an output image, said output image including a representation of said recharge code;
d) means for transmitting said image to the location of said postage metering system; wherein,
e) said input means further comprises means for receiving an input image, said image including a representation of said amount; and wherein,
f) said representation of said amount is in the form of machine readable indicia; and wherein,
g) said input means further comprises an image processor, and wherein data signals representing said input image are input to said image processor, said image processor operating on said data signals to recognize said machine readable indicia and extract said recharge information for input to said data processor.

13. A system as described in claim 12 wherein said image processor further includes means for output of images for display to an operator and second input means for input of signals representative of information represented by said image, whereby said system may display said input image for operator intervention when said image processor fails to extract said recharge information.

14. A system as described in claim 12 wherein said output image is output as signals formatted for printing at said location to generate a recharge form and said form is scanned to enter said recharge information into said postage metering system.

15. A system as described in claim 12 wherein said representation of said recharge code in said output image is in the form of second machine readable indicia.

16. A system as described in claim 15 wherein said output image is output as signals formatted for printing at said location to generate a recharge form and said form is scanned to enter said recharge information into said postage metering system.

17. A system as described in claim 16 wherein said second machine readable indicia further represent digital information for entry of said recharge code in accordance with the operation of said postage metering system.

18. A system as described in claim 17 wherein said output image is output as signals formatted for printing at said location to generate a recharge form and said form is scanned to enter said recharge information into said postage metering system.

* * * * *